May 13, 1947.   E. NORMAN   2,420,614
METHOD OF PRODUCING DECORATIVE EFFECT ON PLASTIC
Filed Jan. 29, 1945

Inventor
Emile Norman
by The Firm of Charles Hille Attys.

Patented May 13, 1947

2,420,614

UNITED STATES PATENT OFFICE 2,420,614

METHOD OF PRODUCING DECORATIVE EFFECT ON PLASTIC

Emile Norman, El Monte, Calif.

Application January 29, 1945, Serial No. 575,139

2 Claims. (Cl. 41—17)

This invention relates to a method of producing decorative or ornamental effects on plastic.

An object of this invention is to provide a simple and economic method of producing a pleasing ornamental effect on a plastic and especially a transparent plastic whereby the plastic takes on a translucent appearance over localized areas.

Another object of this invention is to provide a novel method of treating a plastic sheet with an electric needle in such a way that the plastic sheet may be either pierced or not as desired and yet is given such ornamentation as will afford a contrast to any suitable background behind the plastic sheet.

In accordance with the general features of this invention, there is provided a method of ornamenting a transparent plastic, including a step of pressing a hot needle point into the surface of the plastic to locally melt the plastic and trap gas or vapor bubbles in the needled portions whereby to provide non-transparent ridges without necessarily perforating the plastic.

Still another feature of the invention relates to the arrangement of the needle indentations in the plastic applied as aforesaid so that the ensuing effect is an ornamentation having the general appearance of being a frosted one.

Other objects and features of this invention will more fully appear from the following detailed description taken in connection with the accompanying drawings which illustrate the steps of my method as applied to two different embodiments and in which, Figure 1 is an isometric view of a plastic sheet treated in accordance with this method;

Figure 1:
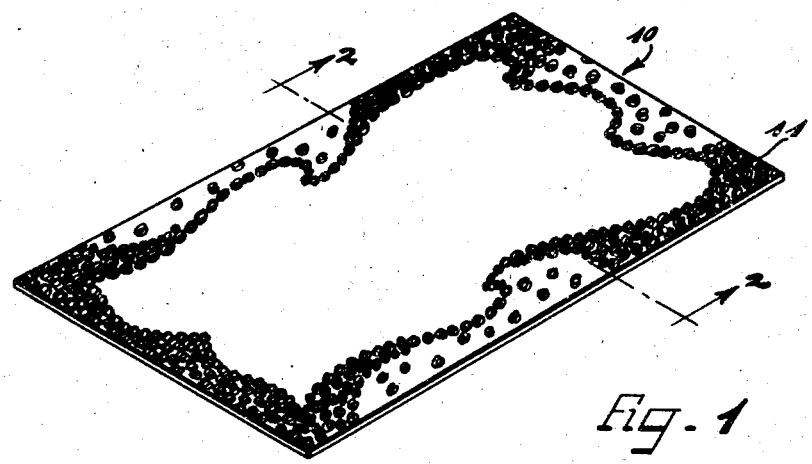

The reference character 10 designates generally a transparent sheet of material, which may be of any suitable type of plastic, such for example, as cellulose acetate, ethyl cellulose or a vinyl resin, or the like. This sheet of plastic has on its top surface a plurality of needle point dents 11 which are formed in the plastic by pressing a hot electric needle point into the surface of the plastic. Such an electric needle may be used singly or multiple needles may be employed. It is contemplated that a plurality of electric needles may be arranged in a common head, in which event, the needles are so disposed as to provide a predetermined design of ornamentation desired in the ultimate product.

It is, of course, well known that plastics have different melting points, depending upon the particular plastic, and the plasticizer or other constituents of the plastic. I have found that in using an electric needle on cellulose acetate, it is desirable to heat the needle to a temperature in the range of from 475° F. to 610° F., with the preferred temperature around 590° F. My invention, however, is not limited to the temperature used since that will vary depending upon the particular plastic being ornamented and the plasticizer employed therein.

In making each of the indentations 11, the needle is pressed into the plastic only to an extent sufficient to cause the plastic locally of the needle point to fuse and form ebullient masses which, upon re-solidification, result in ridges, blisters or raised places in or on the plastic. During this operation of locally melting the plastic, some volatilization may occur, or gaseous products of decomposition may be generated. Whatever the source of the gas or vapor, gas or vapor pockets are formed as a result of the fusion operation, leaving bubbles which are trapped in the plastic around the dents 11 and which cause the dents to have a translucent or even opaque appearance.

The reason for this non-transparency is that the trapping of gas or air, results in a different index of refraction from that of the plastic proper.

Figure 2:
Figure 2 is a cross-sectional view through the sheet taken on the line II—II of Figure 1, looking in the direction indicated by the arrows.

It will be noted from Figures 1 and 2 that the dents do not extend clear through the thickness of the material so that the material is not perforated. This is desirable where imperforate plastic is required in the ultimate ornamental product made from the plastic. I contemplate that the ornamented plastic noted above may be used in boxes or rolled into cylinders or tubes, in accordance with the type of article ultimately desired. However, if it is so desired, the plastic may be pierced clear through with the needle.

The non-transparent raised portions or blisters at the indentations 11 are so arranged in a multiple formation, as shown in Figure 1, as to give the plastic the appearance of being frosted. While each of the portions 11 is translucent, the over-all plastic is still substantially transparent and objects therebehind can be visualized through the portions of the plastic which have not been treated by the electric needle. The portions 11, while not necessarily opaque, are translucent in that they may permit the passage of light therethrough, although not permitting of visualization of objects therethrough.

Figure 3:
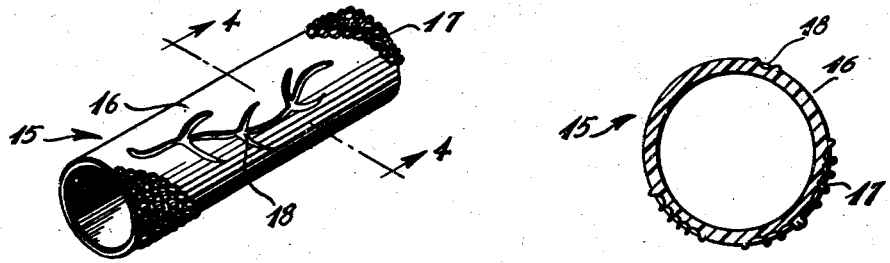
Figure 3 is a view of a cylindrical object of plastic treated in accordance with the features of this invention.
Figure 4:
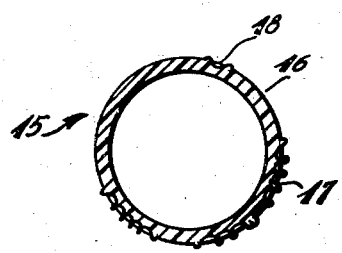
Figure 4 is a cross-sectional view taken on the line IV—IV of Figure 3, looking in the direction indicated by the arrows.

In Figures 3 and 4 I have illustrated a modification of the invention wherein the invention is applied to a tube of plastic. In this form of the invention the tubular object or cylinder 15 is made of plastic material, which may be of any suitable type, such for example, as cellulose acetate. The otherwise smooth surface 16 of object 15, if it is so desired, may be suitably masked to give any desirable design. For illustration, the design may be a leaf, or flower, or any other desired shape.

Thereafter, the exposed plastic surface 16 is subjected to the action of the heated electric needle, forming indentations and raised portions 17 and 18 in the same, which, as in the case of indentations 11, are translucent.

The indentations may be in the form of points 17, or as shown in Figure 3, may be in the form of elongated grooves 18 in the plastic. By substantially treating all of the surface 16 with an electric needle, it is possible to render all of the coating opaque.

An ornamental design may employ a combination of point-like indentations 17 and groove-like indentations 18. In any event, it is not necessary that the indentations extend clear through the layer of plastic of tube 15, although, as noted before, perforating of the plastic is also contemplated.

This treatment with an electric needle, as in the case of the first form, renders the treated portions non-transparent by reason of the change of index of refraction occasioned by the trapping of gas, or vapor bubbles during the fusion of the material under the heat of the needle.

It should be noted that in all forms of the invention, the indenting of the surface of the plastic slightly roughens the same and that this roughened appearance adds to the frost-like effect.

I claim as my invention:

1. In a method of ornamenting fusible transparent synthetic organic thermoplastic material, the steps of first forming the thermoplastic material into a generally transparent layer, drawing a given design on the surface of said layer with a needle point element heated to a fusing temperature of the material while at the same time pressing said element into the surface of said layer to melt and locally fuse the thermoplastic material about the point of the element into irregular dents and ridges, and contemporaneously trapping gases or vapor bubbles in the thus dented and ridged portions of the material to render the same generally translucent and thereby provide the design with a frosted-like appearance.

2. In a method of ornamenting fusible transparent organic thermoplastic material selected from the group consisting of cellulose acetate, ethyl cellulose, and vinyl resin, the steps of first forming the material into a generally transparent layer, drawing a given design on the surface of said layer with a needle point element heated to a fusing temperature of the material in the range of from 475° F. to 610° F. while at the same time pressing the point of said element into said surface to melt and locally fuse the material about the point into irregular dents and ridges, and contemporaneously trapping gases or vapor bubbles in the thus dented and ridged portions of the material to render the same generally translucent and thus provide the design with a frosted-like appearance.

EMILE NORMAN.

REFERENCES CITED

The following references are of record in the file of this patent:

UNITED STATES PATENTS

| Number | Name | Date |
|---|---|---|
| 249,883 | Boynton | Nov. 22, 1881 |
| 676,106 | Valiquet | June 11, 1901 |
| 1,363,897 | Morgan | Dec. 28, 1920 |
| 1,969,273 | Neidich | Aug. 7, 1934 |
| 2,046,000 | Sart | June 30, 1936 |
| 2,322,298 | Johnston | June 22, 1943 |